March 21, 1933.   R. M. HEINTZ   1,902,235
RADIORECEIVER POWER SUPPLY
Filed May 6, 1930
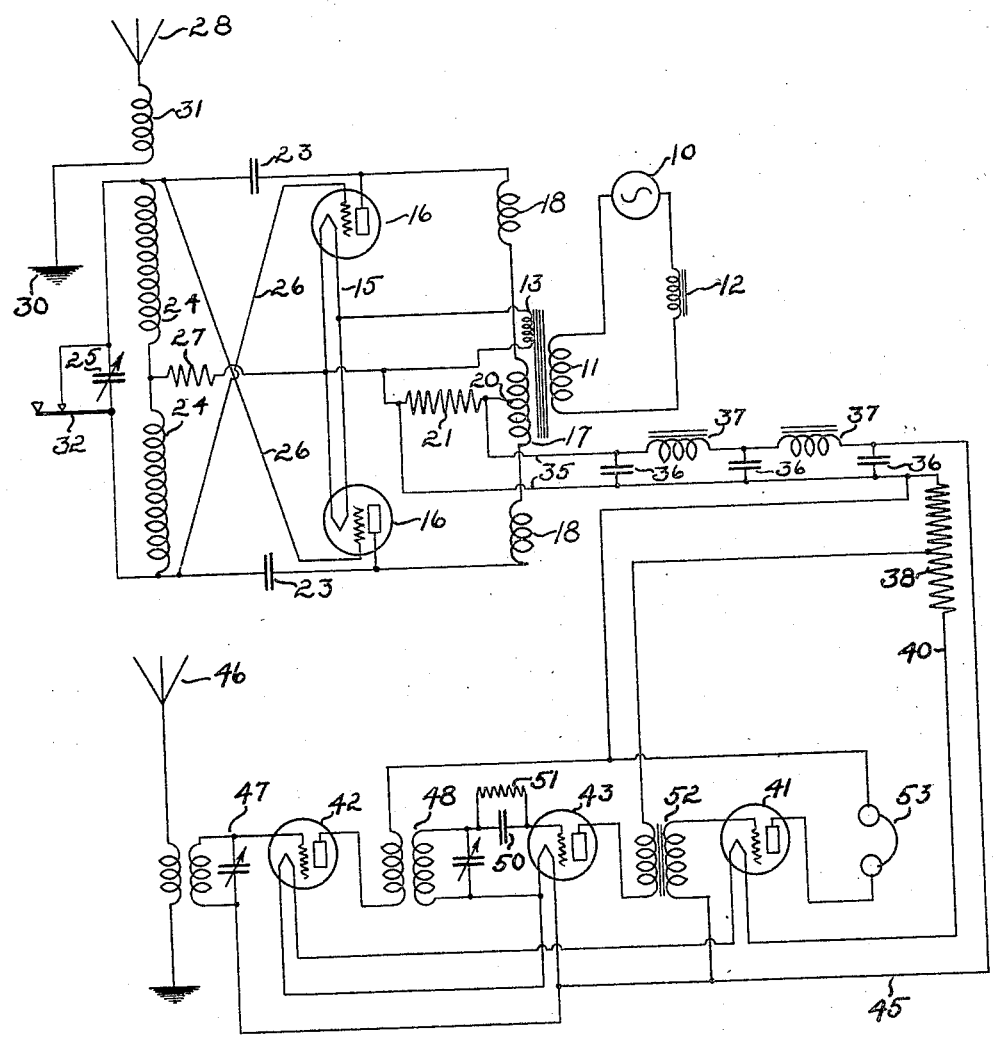
INVENTOR,
RALPH M. HEINTZ.
BY Donald K. Lippincott
ATTORNEY.

Patented Mar. 21, 1933

1,902,235

UNITED STATES PATENT OFFICE

RALPH M. HEINTZ, OF PALO ALTO, CALIFORNIA, ASSIGNOR TO HEINTZ & KAUFMAN, LTD., OF SAN FRANCISCO, CALIFORNIA, A CORPORATION OF NEVADA

RADIORECEIVER POWER SUPPLY

Application filed May 6, 1930. Serial No. 450,165.

My invention relates to power supplies for radio receiving apparatus, and particularly to a system wherein alternating current power is rectified by a transmitter and supplied to the receiver.

Radio equipment designed for military purposes, for aircraft use, for communication with exploration parties, and the like, has as one of its major limitations the weight of the equipment and its accompanying power plant. The power plant may be a battery or batteries, but experience has shown that in so far as the transmitting equipment is concerned, more dependable service together with lighter weight are provided by small magneto generators, which may be driven by hand-power, a small gas engine, or, in the case of aircraft, by a wind driven propeller.

Such generators are preferably built to deliver alternating current, since generators of this type may be made without sliding contacts, with excellent voltage control under varying speed, and having a simplicity and sturdiness of construction and a power output for a given weight which are not obtainable with direct current machines. Altho such generators are admirably adapted to supply power for radio transmitters, the necessity for direct current in the radio receiver has, in the past, led to the retention of battery power supply for this portion of the equipment, since the designers of this apparatus have believed that the expense and complexity of a power pack or rectifier and filter system, fed by the generator, was not warranted.

Among the objects of my invention are: First, to provide a means of supplying power from an alternating source to a receiver in the class above mentioned; second, to supply power for the receiver utilizing apparatus already provided for the transmitter; third, to provide a receiver power supply of minimum weight; fourth, to provide a receiver power supply which is operative without manipulating any transfer switch or switches other than the usual key; and fifth, to provide a radio receiver and transmitter, which is operated as a single unit, and is adapted for military, aircraft, and other uses where minimum weight is important.

My invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

The figure of the drawing is a schematic diagram showing the circuit of a radio transmitter and receiver embodying my invention.

In broadly descriptive terms, my invention comprises a radio transmitter of the vacuum tube type, and a supply of alternating current power for the operation thereof. A circuit, preferably shunted by an impedance, is connected in series with the anode and cathode of the transmitter tube, and this circuit is arranged to supply the operative power for a radio receiver. Means are provided for keying the transmitter without interrupting the power supply; this keying means may, for example, be a key which is arranged to short-circuit the oscillating circuit of the transmitter during the periods of non-transmission, the key being open when depressed to allow the circuit to oscillate. The branch circuit supplying the power for the receiver operation is preferably provided with filter means of suitable type for converting the unidirectional power into a steady uniform flow. The receiver is preferably operated with all of its filament and plate voltages in series, so as to require a minimum of current flow, and to permit the cathode and plate current to be supplied by a single source.

In the form of my invention disclosed in the drawing, the current is supplied by a generator 10 which feeds a transformer having a primary winding 11. In field sets, of the type to which my invention is primarily suited, the generators used are subjected to a considerable variation in the speed, and therefore there is preferably included in the circuit a reactor 12 which serves to limit the voltage delivered to the transformer to a substantially constant value as the speed varies. This reactance may, if desired, be included in the generator winding itself, or in the transformer.

The transformer is provided with a low voltage winding 13 which supplies a filament circuit 15 for heating the cathodes of the two transmitting tubes 16. The transformer also has a high voltage winding 17, the terminals of which are connected thru radio frequency choke-coils 18 to the plates of the two tubes.

A center tap 20 on the winding 17 of the transformer connects thru a resistance 21 with the filament circuit 15. The resistance may be considered as in series with either of the tubes 16, and thru it passes current rectified by the two tubes, passing thru either tube only when its plate is positive with reference to its cathode or filament. The rectified current in the resistance 21 therefore produces a unidirectional potential drop across the resistance.

Coupled to the tubes 16 is a symmetrical oscillating circuit. Blocking condensers 23 are connected between the plates of the tubes and the oscillating circuit, which comprises coils 24 in parallel with the variable condenser 25. A connection 26 joins the grid of each of the tubes 16 to that end of the oscillating circuit which is connected to the plate of the other tube. Proper bias for the grids of the tubes is provided thru a grid leak 27 which connects from the junction of the two coils 24 to the filament circuit 15.

An antenna circuit of any suitable type, such as the elevated conductor 28 and ground 30 is coupled to one of the coils 24 by means of a suitable coil 31.

The transmitter thus described is one form of self-rectifying oscillating circuit. The oscillations are generated by the two tubes 16 alternately, each tube being operative when its plate is positive with respect to its filament. This circuit is here shown since it utilizes both halves of the supply cycle, but my invention is also applicable where only half of the wave is used.

Any suitable method of keying the transmitter may be used which does not interrupt the power supply. The keying means shown is bridged across the condenser 25, and comprises a "back-contact" key 32, i. e., a key which opens the circuit instead of closes it. When the key is up the two ends of the oscillating circuit are shorted, and no wave is generated by the device. Depressing the key permits oscillation to take place.

The current supply for the receiver is bridged across the resistor 21, and comprises a circuit 35 connecting to a conventional filter having shunt condensers 36 and series inductors 37. This filter serves to convert the pulsating unidirectional current delivered by the tubes 16 into a uniform current satisfactory for operating the radio receiver. Connected to the positive output terminal of the filter is a resistor 38, which is used as a voltage divider, connected thru the wire 40 in series with the filament of the tubes 41, 42 and 43, and thence thru the lead 45 back to the negative terminal of the filter.

Any satisfactory type of receiver, using any desired number of tubes, may be used in connection with my invention. The one shown operates on a separate receiving antenna 46, to which is coupled a resonant circuit 47 which applies the received signals to the grid and filament of the tube 42. A tuned radio frequency transformer 48, connected to the output circuit of the tube 42 feeds the grid of the detector tube 43 thru the usual condenser 50 and grid leak 51.

The detector tube 43 is coupled thru an audio frequency transformer 52 to the audio frequency amplifier tube 41, in whose output circuit the head-phones or other translating device 53 are located. By means of the voltage divider 38 the proper potentials for the amplifier tubes 41 and 42, and the detector tube 43 are supplied. The voltage drop thru the filaments of the receiving tubes may be utilized as shown to provide the proper grid bias for each tube.

An actual installation of the type here described uses tubes in the transmitter, drawing 250 milliamperes with 1500 volts impressed upon each plate. The resistor 21 is of such proportions as to give a voltage drop of about 100 volts, while the receiving set consumes about 60 milliamperes, this being the normal filament current of the tubes used. The only apparatus, in addition to that required for the transmitter, required to supply the receiver power is the small filter, the resistor 21, and the voltage divider, and the entire power supply equipment weighs less than a battery for supplying the filament circuit alone.

I claim:

1. In combination, a transmitter for radio waves having a vacuum tube, a transformer for supplying an alternating potential between the cathode and anode of said tube, an impedance in series with said tube and said transformer, and a circuit bridged across said impedance for supplying rectified current to a receiver for radio waves.

2. In combination, a transmitter for radio waves comprising a vacuum tube and an oscillating circuit connected thereto, a power source connected to said tube for impressing an alternating potential between the cathode and anode thereof, means for supplying current rectified by said tube to a receiver for said waves, and means independent of said power source for keying said transmitter.

3. In combination, a transmitter for radio waves comprising a vacuum tube and an oscillating circuit connected thereto, a power source connected to said tube for impressing an alternating potential between the cathode and anode thereof, means for supplying current rectified by said tube to a receiver for said waves, and means independent of said power source preventing oscillations in said oscillating circuit.

4. In combination, a transmitter for radio waves comprising a pair of vacuum tubes, a power source arranged to impress an operating potential across said tubes alternately, a receiver for said waves, an impedance in series with said power source and with both of said tubes, and a circuit bridged across said impedance for supplying current rectified by said tubes to said receiver.

5. In combination, a transmitter for radio waves comprising an oscillating circuit, and a pair of vacuum tubes each connected to excite oscillations in said circuit; a source of alternating current having its opposite terminals connected respectively to the anodes of said tubes, a circuit connected from a tap intermediate said terminals to the cathodes of said tubes, and a receiver for radio waves connected to receive power for its operation from said circuit.

6. In combination, a transmitter for radio waves comprising a vacuum tube, a source of alternating potential connected to supply anode current to said tube, a circuit connected in series with said source and said tube, and a receiver for radio waves connected in said circuit and deriving power for its operation therefrom.

7. In combination, a transmitter for radio waves comprising a vacuum tube, a source of alternating potential connected to supply anode current to said tube, a circuit connected in series with said source and said tube, and a receiver for radio waves comprising a vacuum tube connected to receive its anode and filament potentials in series from said circuit.

8. In combination, a transmitter for radio waves comprising a vacuum tube, a source of alternating potential connected to supply anode current to said tube, a circuit connected in series with said source and said tube, a low pass filter in said circuit, and a receiver for radio waves connected in said circuit and deriving power for its operation therefrom.

9. In combination, a radio transmitter including an oscillating vacuum tube and a source of alternating current energizing said tube, a radio receiver, and means connected with said vacuum tube for supplying rectified current from the output thereof to energize said receiver.

10. In combination, a radio transmitter including a vacuum tube coupled to an oscillating circuit, a source of alternating current energizing said tube, a radio receiver, means associated with said vacuum tube for supplying rectified current from the output thereof to energize said receiver, and keying means operating directly upon said oscillating circuit to de-energize said circuit independently of said source.

11. In combination, a transmitter for radio waves comprising a vacuum tube and an oscillating circuit connected thereto, a power source connected to said tube for impressing an alternating potential between the anode and cathode thereof, means for supplying current rectified by said tube to a receiver for said waves, and a circuit opening key arranged normally to short circuit said oscillating circuit independently of said power source.

In testimony whereof, I have hereunto set my hand.

RALPH M. HEINTZ.